C. CURTIS.
Seed Planter and Harrow.
No. 82,387. Patented Sept. 22, 1868.
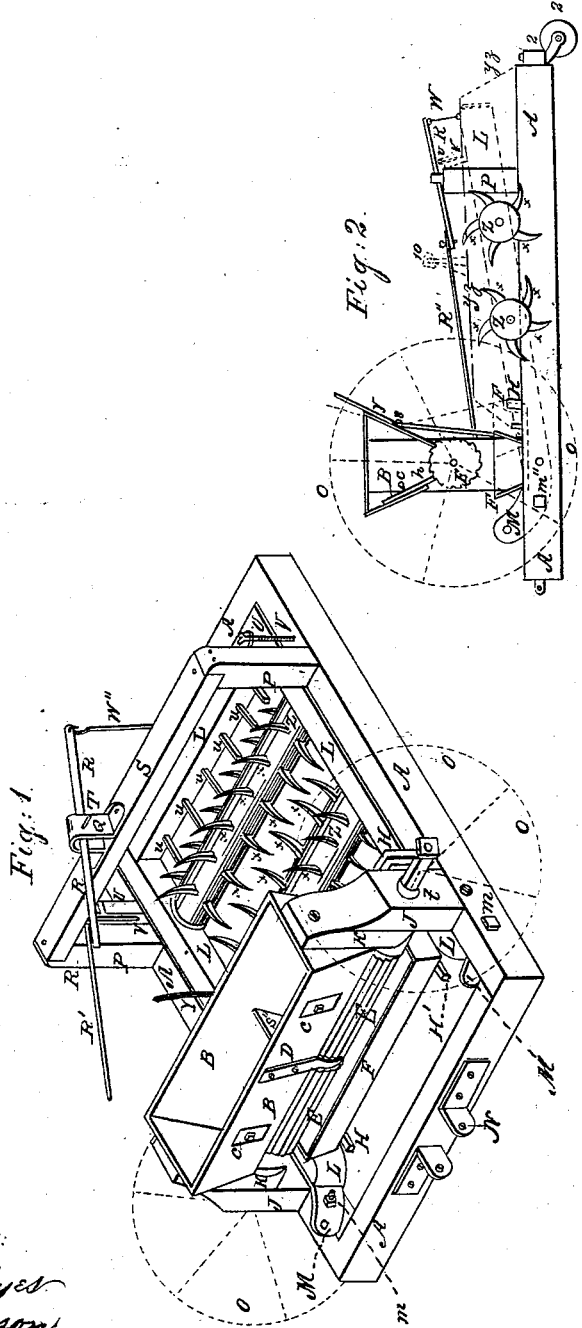
Witnesses:
N. E. Hayes
John A. Johnson
Inventor.
Charles Curtis

United States Patent Office.

CHARLES CURTIS, OF GALESBURG, ILLINOIS.

Letters Patent No. 82,387, dated September 22, 1868.

---

IMPROVEMENT IN SEED-SOWER AND HARROW COMBINED.

---

The Schedule referred to in these Letters Patent and making part of the same.

---

Be it known that I, CHARLES CURTIS, of Galesburg, in the county of Knox, and State of Illinois, have invented a new and useful Seed-Sower and Harrow Combined; and I do hereby declare that the following is a full, clear, and exact description thereof, which will enable others skilled in the art to make and use the same, reference being had to the accompanying drawings, forming part of this specification.

This invention relates to a new and improved arrangement for sowing wheat, oats, barley, and such seeds broadcast, and for harrowing the seeds into the ground at the same operation.

And the invention consists in providing a box to carry the seed, with suitable mechanism for scattering or sowing the same, said mechanism and box being mounted on a frame suitable for attaching thereto harrows in a manner to be under the entire control of the driver or operator.

Figure 1 is a perspective view of the machine.

Figure 2 is a side view of the same.

Similar letters of reference refer to corresponding parts.

A represents a rectangular frame, of suitable size and strength, to which is attached the tongue or draught-pole, at N, fig. 1.

J and K, fig. 1, represent uprights from the frame A, with suitable boxing for the axle $''t$.

$''t$, fig. 1, represents the axle to which the main wheels $o\ o$ are attached solid, so as to revolve the axle with the motion of the wheels.

The axle $''t$ is divided in the centre, and each end held in position by the strap D, which passes beneath and forms a boxing for the journals at each end of the divided axle.

E E represent two drums, one on each axle, and the surfaces of said drums are serrated, as seen at figs. 1 and 2.

B represents a box, narrow and open at the bottom, and supported by the uprights J and K.

L represents the frame proper of the harrow, and is made to fit inside of the main frame.

The frame L is attached to the main frame A by means of the plate M and bolt $m''$, fig. 1.

Z Z represent cylindrical-shaped shafts, attached to frame L by means of journals and boxing, which admit of their revolving freely.

X X represent teeth, slightly "hooking" in shape, and sharp on the front side.

W W represent teeth attached to the frame L, and projecting forward between the teeth X on the rear cylinder.

The lower edge of teeth W is sharp, in order to thoroughly cut loose stalks, &c., which may entangle in the teeth X X.

P P represent uprights for supporting the cross-piece S, which supports the device Q, in which the lever R is pivoted, by means of which, in connection with the rod W, the rear end of the harrow may be raised, as seen by the dotted lines L, fig. 2.

The ends $''R\ R$ of the lever $''R\ R$ are pivoted to each other, so as to admit of being thrown around and out of the way of the driver.

U represents an upright bar, attached to the frame L, and bent over at the top, through which passes the set or thumb-screw V, the end of which rests on the main frame, A, by means of the devices U V. The depth of rear end of harrows may be regulated at will.

F, figs. 1 and 2, represents a box, which is operated on the slides H H by means of the lever Y. This box, while the machine is intended to be sowing, may be slid back to the position of dotted lines F, fig. 2, and, while turning, may be made to catch the grain that falls by means of being slid to the position F', solid lines, fig. 2.

$h''$, fig. 2, represents a slide or gauge-board for regulating the flow of grain, and may be set, as desired, by means of set-screws C.

2, fig. 2, represents a caster-wheel, for supporting the rear end of the frame A.

S″, fig. 1, represents a division or partition-board in the box B, and prevents the grain dropping at that point. At same time it strengthens the box at that point.

To operate this machine, the grain is put in the box B, and the slide h″ being regulated to govern the flow, the machine is started, and the revolving of the cylinders E, which extend up into the opening of the box B, draws the grain from the box, and distributes it evenly and nicely, the full width of the box B, and the harrows, coming immediately after, tend to thoroughly incorporate the seed in the ground and smooth the surface at the same time.

The plate M, being curved up at the end, and provided with a series of holes, furnishes a means, in connection with the bolt m″, of regulating the depth of harrow at front end.

The red lines y z, fig. 2, represent a cover, which can be placed on the machine, and which carries the seat 10.

Having thus described my invention, what I claim as new, and desire to secure by Letters Patent, is—

The hopper B, drum E, box F, and bar H, constructed and arranged as described, and combined with the adjustable frame L and revolving harrows Z, substantially as set forth and for the purpose described.

CHARLES CURTIS.

Witnesses:
    W. B. RICHARDS.
    GEO. B. MORGAN.